United States Patent
Oki et al.

(10) Patent No.: US 12,423,124 B2
(45) Date of Patent: Sep. 23, 2025

(54) DEPLOYING VIRTUAL MACHINES IN A SOFTWARE-DEFINED DATA CENTER

(71) Applicant: VMware, Inc., Palo Alto, CA (US)

(72) Inventors: Brian Masao Oki, San Jose, CA (US); Ramsés V. Morales, Sunnyvale, CA (US); Adrian Drzewiecki, Mountain View, CA (US); Konstantinos Roussos, Sunnyvale, CA (US); Olivier Alain Cremel, Los Altos, CA (US)

(73) Assignee: VMware LLC, Palo Alto, CA (US)

( * ) Notice: Subject to any disclaimer, the term of this patent is extended or adjusted under 35 U.S.C. 154(b) by 624 days.

(21) Appl. No.: 17/580,488

(22) Filed: Jan. 20, 2022

(65) Prior Publication Data
US 2023/0229476 A1   Jul. 20, 2023

(51) Int. Cl.
G06F 9/46    (2006.01)
G06F 9/455   (2018.01)
G06F 9/50    (2006.01)

(52) U.S. Cl.
CPC ........ G06F 9/45558 (2013.01); G06F 9/5077 (2013.01); *G06F 2009/45562* (2013.01); *G06F 2009/4557* (2013.01); *G06F 2209/501* (2013.01); *G06F 2209/505* (2013.01)

(58) Field of Classification Search
None
See application file for complete search history.

(56) References Cited

U.S. PATENT DOCUMENTS

| | | | |
|---|---|---|---|
| 11,616,686 B1 * | 3/2023 | Chandrachood | G06F 9/5005 709/220 |
| 2010/0293544 A1 * | 11/2010 | Wilson | G06F 9/4401 718/1 |
| 2011/0060859 A1 * | 3/2011 | Shukla | G06F 9/45558 718/1 |
| 2016/0204977 A1 * | 7/2016 | Cui | G06F 11/00 370/221 |

\* cited by examiner

*Primary Examiner* — Bing Zhao
(74) *Attorney, Agent, or Firm* — Kim & Stewart LLP

(57) ABSTRACT

An example method of deploying a virtual machine (VM) in a software-defined data center (SDDC) includes: receiving a VM specification for the VM at an elastic control plane executing in a cluster of hosts having a virtualization layer; composing, by the elastic control plane in response to the VM specification, logical resources of the cluster managed by the virtualization layer; composing, by the elastic control plane, physical resources of the SDDC to add new hardware to the cluster; expanding, by the elastic control plane, the logical resources with new logical resources managed by the virtualization layer and backed by the new hardware; and deploying, by the elastic control plane, the VM in a virtual environment composed from the logical resources as expanded.

17 Claims, 6 Drawing Sheets

DEPLOYING VIRTUAL MACHINES IN A SOFTWARE-DEFINED DATA CENTER

Applications today are deployed onto a combination of virtual machines (VMs), containers, application services, physical servers without virtualization, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A user, or automated software on behalf of an Infrastructure as a Service (IaaS), interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

With the emergence of composable, disaggregated hardware—such as CPUs and graphic processing units (GPUs) that use specialized fabric interconnects and programable smart network interface cards (NICs)—user workloads are rapidly evolving from monolithic application to simpler collections of services provisioned on such hardware. It is an emerging category of infrastructure that optimizes resource utilization and improves business agility. Conventional virtualization solutions, however, provide only resource management of CPU, memory, and storage, designed for efficient use of pre-assembled servers with shared storage. Conventional virtualization solutions suffer from single point of failures (e.g., the virtualization management server) and are not designed to provision workloads on composable, disaggregated hardware.

SUMMARY

Embodiments include a method of deploying a virtual machine (VM) in a software-defined data center (SDDC). The method includes: receiving a VM specification for the VM at an elastic control plane executing in a cluster of hosts having a virtualization layer; composing, by the elastic control plane in response to the VM specification, logical resources of the cluster managed by the virtualization layer; composing, by the elastic control plane, physical resources of the SDDC to add new hardware to the cluster; expanding, by the elastic control plane, the logical resources with new logical resources managed by the virtualization layer and backed by the new hardware; and deploying, by the elastic control plane, the VM in a virtual environment composed from the logical resources as expanded.

Further embodiments include a non-transitory computer-readable storage medium comprising instructions that cause a computer system to carry out the above methods, as well as a computer system configured to carry out the above methods.

DETAILED DESCRIPTION

Figure 1:
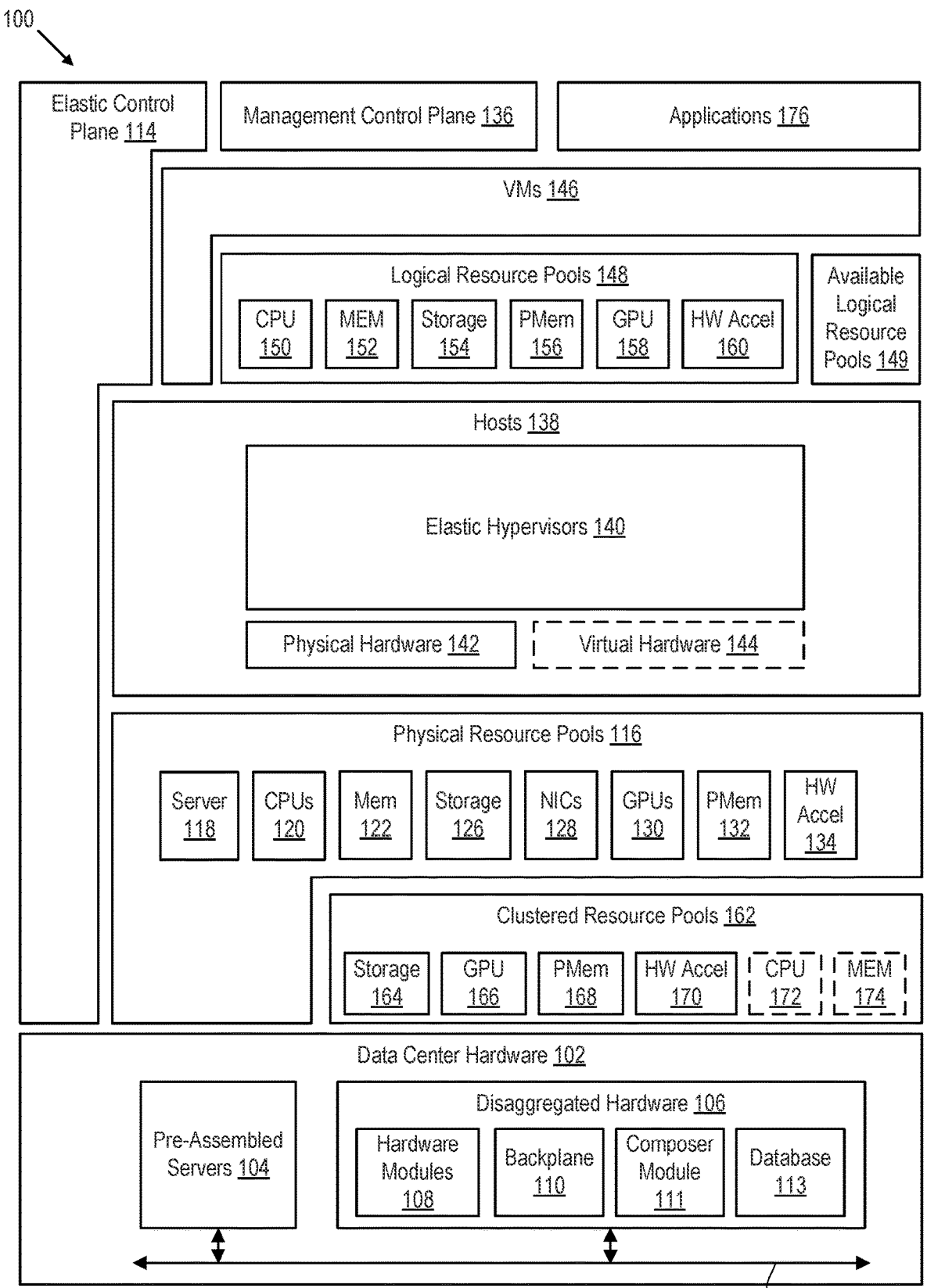
FIG. 1 is a block diagram depicting a software-defined data center (SDDC) according to an embodiment.

FIG. 1 is a block diagram depicting a software-defined data center (SDDC) 100 according to an embodiment. SDDC 100 includes data center hardware 102. In embodiments, data center hardware 102 includes pre-assembled servers 104 and disaggregated hardware 106. Pre-assembled servers 104 can be constructed using server-grade hardware platforms, such as x86 architecture platforms or the like. The hardware platforms include conventional components of a computing device, such as one or more central processing units (CPUs), system memory (e.g., random access memory (RAM)), network interface controllers (NICs), storage devices, and the like.

Disaggregated hardware 106 comprises collections of hardware resources, such as CPU, memory, storage, network, and the like resources. In contrast to disaggregated hardware 106, each of pre-assembled servers 104 comprises a set of aggregated hardware functioning as a computing device. In embodiments, disaggregated hardware 106 includes hardware modules 108, where each hardware module 108 comprises a set of resources (e.g., a set of CPUs, a set of memory, a set of storage devices, etc.). Hardware modules 108 can be interconnected through a backplane 110. Disaggregated hardware 106 can be physically located in chassis (e.g., racks or frames), each having a set of hardware modules 108 and a backplane 110. Disaggregated hardware 106 can include a composer module 111 that includes software and/or firmware configured to compose physical resources thereof into computing devices that have the same or similar functionality as pre-assembled servers 104. Composer module 111 can access a database 113, which stores information describing all physical resources of disaggregated hardware 106. In embodiments, database 113 can also store information describing resources of pre-assembled servers 104. In embodiments, composer module 111 and/or database 113 executes in pre-assembled servers) 104. Chassis of disaggregated hardware 106 and pre-assembled servers 104 can be connected using a physical network 112. Physical network 112 includes cabling, physical network switches (e.g., top-of-rack (TOR) switches), routers, and the like.

SDDC 100 includes hosts 138. Software executing in SDDC 100, described further herein, composes physical resources of data center hardware 102 into hosts 138. For example, a host 138 can be a pre-assembled server 104. A host 138 can be composed from physical resources of disaggregated hardware 106 (e.g., CPU, memory, storage, NIC, etc.), which may be in the same chassis or across different chassis. A host 138 can be composed as a combination of a pre-assembled server 104 and physical resource(s) of disaggregated hardware 106.

Each host 138 includes a virtualization layer, referred to herein as an elastic hypervisor 140, which directly executes on a hardware platform of the host. The host hardware platform includes physical hardware 142 and optionally virtual hardware 144. Physical hardware 142 includes, for example, the CPU, memory, storage, network, etc. resources of a pre-assembled server 104 or of a composition of such resources from disaggregated hardware 106. Virtual hardware 144, as described further herein, comprises physical resources or software-defined resources accessible by a host 138 through NICs having a data processing unit (DPU) (referred to as "smart NICs"). For example, a host 138 comprising a pre-assembled server 104 can include a smart NIC that presents a remote physical resource (not part of the pre-assembled server) as a local physical resource (e.g., a physical resource of disaggregated hardware 106 or a physical resource of another pre-assembled server 104). In another example, a host 138 comprising a pre-assembled server 104 can include a smart NIC that executes software on its DPU to present a software-defined resource to host 138. SDDC 100 can include some non-virtualized hosts (not shown), which include physical resources of data center hardware 102, and which include a host operating system (OS).

In embodiments, there is no intervening software, such as a host OS, between elastic hypervisor 140 and the hardware platform of each host 138. As such, elastic hypervisor 140 is a Type-1 hypervisor (also known as a "bare-metal" hypervisor). Elastic hypervisor 140 abstracts processor, memory, storage, network, and the like resources of host 138 to provide a virtual execution space within which multiple virtual computing instances may be concurrently instantiated and executed. In embodiments, the virtual computing instances comprise virtual machines (VMs) 146. VMs 146 execute software, which includes instance(s) of elastic control plane 114, instance(s) of management control plane 136, and various applications 176. A VM 146 executing application(s) 176 may also be referred to as a workload.

Software executing in SDDC 100 forms hosts 138 into groups. Some groups of hosts 138 are clusters managed by a management control plane 136 (the term "cluster" as used herein refers to hosts 138 managed by an instance of management control plane 136). Other groups of hosts 138 are not managed by an instance of management control plane 136. SDDC 100 includes elastic control plane 114. In embodiments, each cluster of hosts 138 includes an instance of elastic control plane 114. In other embodiments, an instance of elastic control plane 114 can manage multiple clusters of hosts 138. As described herein, elastic control plane 114 is configured to compose physical hardware (e.g., adding new hosts 138 or adding virtual hardware 144 to existing hosts 138) on demand and as needed when provisioning workloads.

To provision a workload, a user or software provides a VM specification to elastic control plane 114. The VM specification describes the virtual resources required for the workload to run in SDDC 100. Elastic control plane 114 deploys workloads in defined logical resource pools, described further herein. If a logical resource pool has insufficient resources for a workload based on its VM specification, elastic control plane 114 composes new virtual and/or physical hardware on demand without user involvement. Software of elastic control plane 114 can execute directly on data center hardware 102, directly on hardware of hosts 138 (e.g., as kernel-mode and/or user-mode processes of elastic hypervisors 140), in VMs 146, or any combination thereof.

Figure 2:
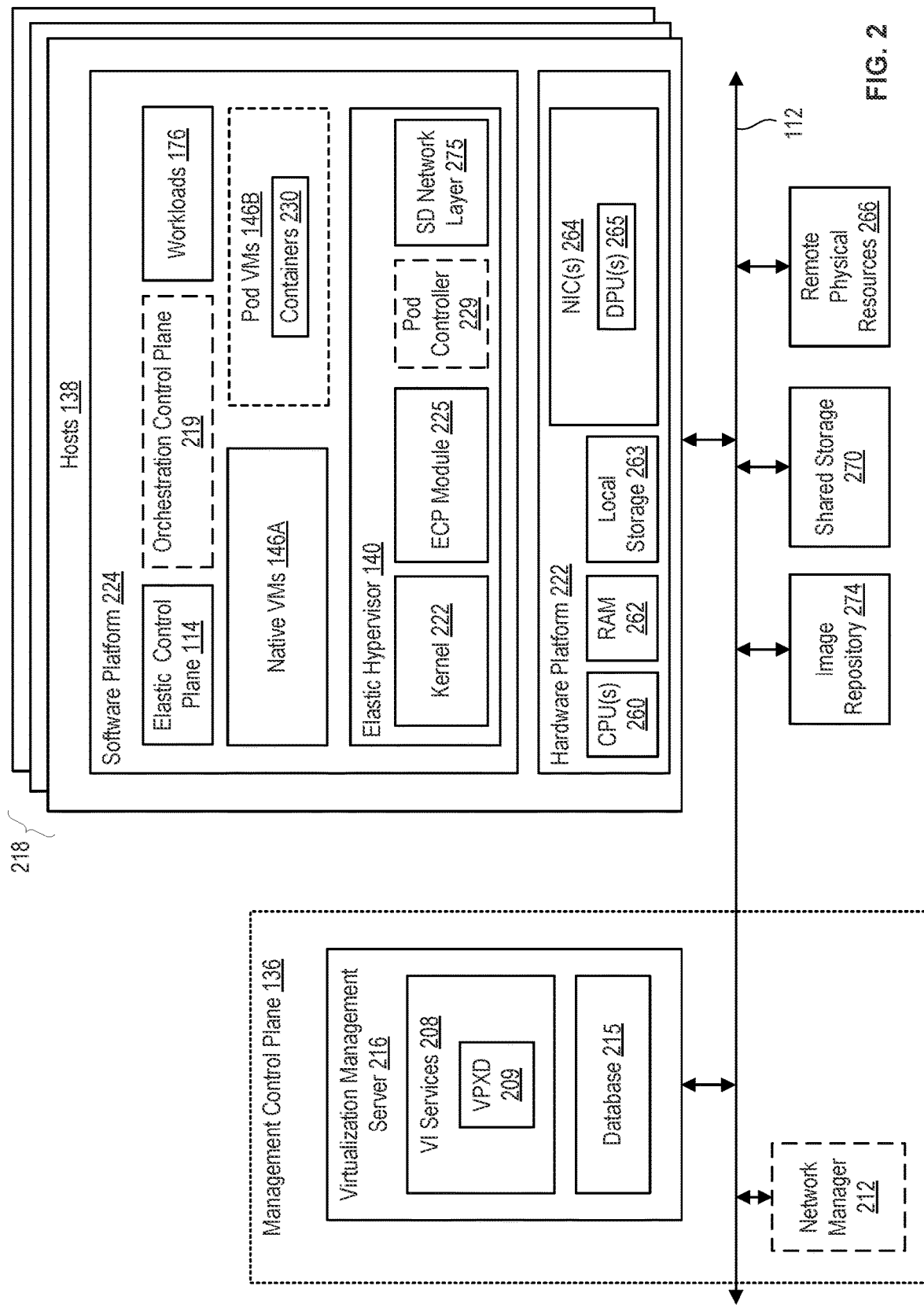
FIG. 2 is a block diagram depicting a cluster of hosts according to embodiments.

FIG. 2 is a block diagram depicting a cluster 218 of hosts 138 according to embodiments. Each host 138 includes a software platform 224 executing on a hardware platform 222. Hardware platform 222 of each host 138 includes conventional components of a computing device, such as one or more central processing units (CPUs) 260, system memory (e.g., random access memory (RAM) 262), one or more network interface controllers (NICs) 264, and optionally local storage 263. CPUs 260 are configured to execute instructions, for example, executable instructions that perform one or more operations described herein, which may be stored in RAM 262. NICs 264 enable host 138 to communicate with other devices through physical network 112. One or more of NICs 264 can be a smart NIC having a data processing unit (DPU) 265. DPU 265 includes CPU(s), memory, hardware accelerators, and the like. DPU(s) 265 can interface with remote physical resources 266 (physical resources external to a host 138) and present such physical resources as part of hardware platform 222. DPU(s) 265 can also execute software to present software-defined resource(s) as part of hardware platform 222.

In embodiments, hosts 138 access shared storage 270 by using NICs 264 to connect to network 112. In other embodiments, each host 138 includes a host bus adapter (HBA) through which input/output operations (IOs) are sent to shared storage 270 over a separate network (e.g., a fibre channel (FC) network). Shared storage 270 include one or more storage arrays, such as a storage area network (SAN), network attached storage (NAS), or the like. Shared storage 270 may comprise magnetic disks, solid-state disks, flash memory, and the like as well as combinations thereof. In some embodiments, hosts 138 include local storage 263 (e.g., hard disk drives, solid-state drives, etc.). Local storage 263 in each host 138 can be aggregated and provisioned as part of a virtual SAN (vSAN), which is another form of shared storage 270.

Software platform 224 includes elastic hypervisor 140. Elastic hypervisor 140 abstracts processor, memory, storage, and network resources of hardware platform 222 to provide a virtual execution space within which multiple VMs 146 may be concurrently instantiated and executed. VMs 146 can include native VMs 146A. Software in a native VM 146 includes a guest OS and applications executing thereon. In embodiments, software platform 224 can include software executing in containers 230. Containers 230 can be deployed in specialized VMs referred to as "pod VMs 146B." A pod VM 146B is a VM that includes a kernel and container engine that supports execution of containers, as well as an agent (referred to as a pod VM agent) that cooperates with a controller executing in elastic hypervisor 140. In other embodiments, containers 230 can execute in native VMs 146A or directly on elastic hypervisor 140 as a virtual computing instance.

An instance of management control plane 136 includes a virtualization management server 216. Virtualization management server 216 manages hosts 138 and the hypervisors therein. Virtualization management server 216 can be an appliance deployed in one or more VMs 146 in SDRC 100 (e.g., in duster 218 or in host(s) external to cluster 218). While virtualization management server 216 is typically deployed in VM(s) 146, it can also be deployed in a non-virtualized host executing on a host OS. In embodiments, virtualization management server 216 logically group hosts 138 into cluster 218 to provide cluster-level functions to hosts 138 through virtual infrastructure (VI) services 208. The number of hosts 138 in host cluster 218 may be one or many. Virtualization management server 216 can manage more than one cluster 218. VI services 208 can include various services, such as a management daemon (VPXD 209), high-availability (HA) service, single sign-on (SSO) service, and the like. VI services 208 persist data in a database 215, which stores an inventory of objects, such as clusters, hosts, VMs, datastores, and the like. Users interact with VI services 208 through user interfaces, application programming interfaces (APIs), and the like to issue commands. VPXD 209 is a centralized management process configured to cooperate with other VI services 208 for object management. VPXD 209 is configured to create, update, delete objects, such as data centers, clusters, hosts, VMs, datastores, and the like. This configuration of cluster 218 is referred to as a traditional cluster.

Cluster 218 is configured with a software-defined (SD) network layer 275. SD network layer 275 includes logical network services executing on virtualized infrastructure of hosts 138. The virtualized infrastructure that supports the logical network services includes hypervisor-based components, such as distributed switches, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure. In an embodiment, management control plane 136 further includes a network manager 212. Network manager 212 is a physical or virtual server that orchestrates SD network layer 275. In an embodiment, network manager 212 comprises one or more virtual servers deployed as VMs 146. One example of an SD networking platform that can be configured and used in embodiments described herein as network manager 212 and SD network layer 275 is a VMware NSX® platform made commercially available by VMware, Inc. of Palo Alto, CA In other embodiments, SD network layer 275 is orchestrated and managed by virtualization management server 216 without the presence of network manager 212.

In embodiments, virtualization management server 216 can enable cluster 218 as a supervisor cluster having an orchestration control plane 219. Orchestration control plane 219 executes in VMs 146. Orchestration control plane 219 includes a container orchestrator, such as Kubernetes®, to deploy and manage applications or services thereof in pod VMs 146B on hosts 138 using containers 230. Elastic hypervisor 140 includes a pod VM controller 229. Orchestration control plane 219 creates, manages, destroys pod VMs 146B through pod controller 229, which interfaces with pod VM agents in pod VMs 146B. In embodiments, some or all pod VMs 146B can be managed and controlled by another control plane (e.g., elastic control plane 114) regardless of the presence or absence of orchestration control plane 219.

Cluster 218 includes an instance of elastic control plane 114. Elastic control plane 114 can execute in one or more VMs 146. Elastic hypervisor 140 includes an ECP module 225 configured to run and manage elastic control plane 114. ECP module 225 is distributed across elastic hypervisors 140 in cluster 218 and functions to ensure an instance of elastic control plane 114 is always running in cluster 218 (e.g., in the presence of host downtime, host failures, etc.). In embodiments, the services of elastic control plane 114 are replicated and load-balanced across a plurality of hosts 138 in cluster 218.

Figure 3:
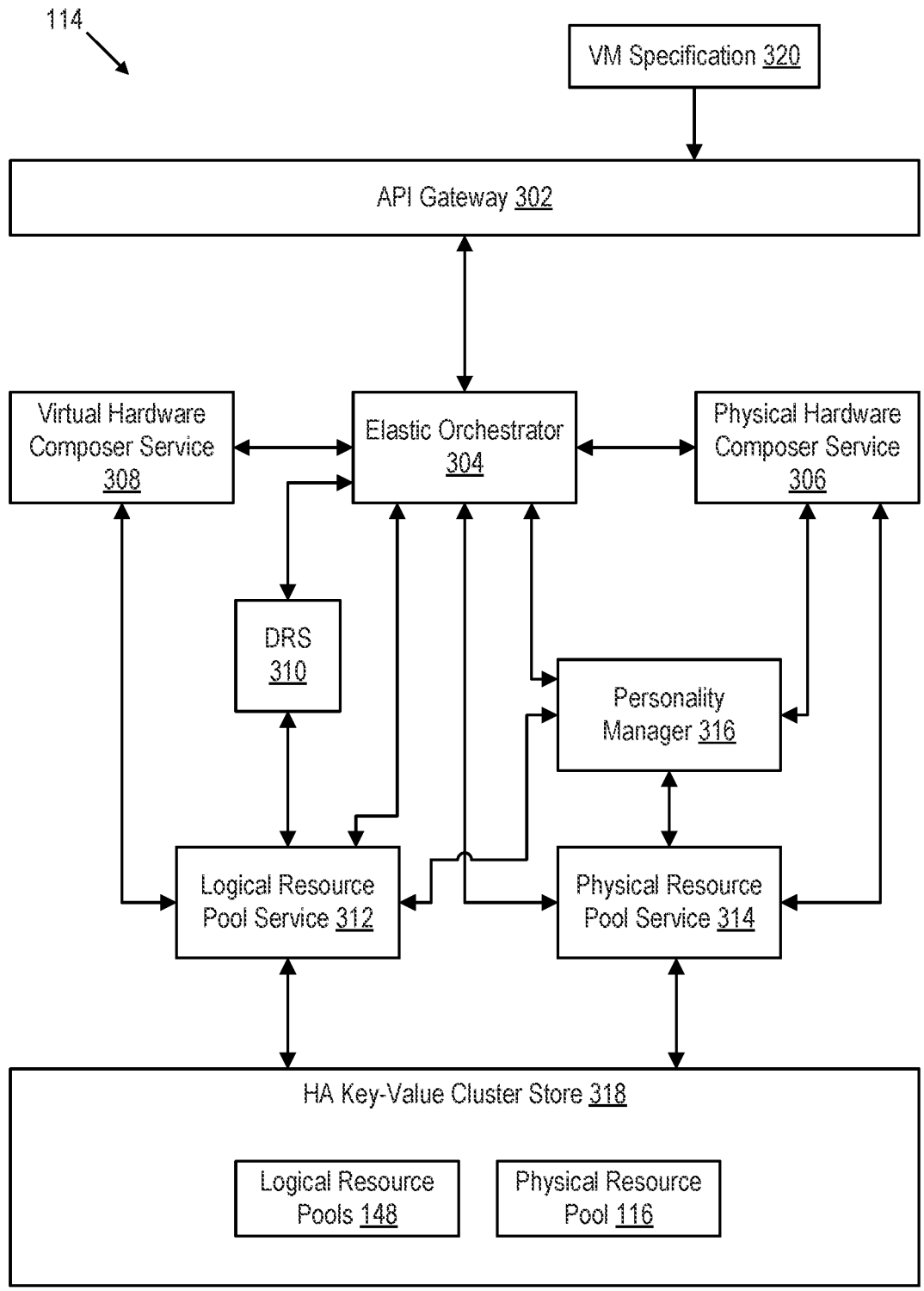
FIG. 3 is a block diagram depicting an instance of an elastic control plane according to embodiments.

FIG. 3 is a block diagram depicting an instance of elastic control plane 114 according to embodiments. Elastic control plane 114 includes an API gateway 302, an elastic orchestrator 304, a physical composer service 306, a virtual hardware composer service 308, a dynamic resource scheduler (DRS) 310, a logical resource pool service 312, a physical resource pool service 314, a personality manager 316, and a high-availability (HA) key-value cluster store 318. With reference to FIGS. 1-3, API gateway 302 is the entry point into elastic control plane 114 and provides a user or software the capability of performing various operations, such as provisioning VMs, manipulating physical resources, performing admission control, migrating VMs, and the like. API gateway 302 provides an interface to the various other services of elastic control plane 114.

Physical resource pool service 314 manages a physical resource pool 116 for cluster 218. When a user or software adds a host 138 to cluster 218, physical resource pool service 314 adds the physical resources of the host to physical resource pool 116. As such, physical resource pool 116 includes physical resources of all hosts 138 in cluster 218. If a host 138 is removed from cluster 218, physical resource pool service 314 removes its resources from physical resource pool 116. Elastic orchestrator 304 can invoke APIs of physical resource pool service 314 to add/remove physical resources from physical resource pool 116 in response to host add/remove. For example, a VPXD executing in virtualization management server 216 can notify elastic orchestrator 304 of host add/delete through API gateway 302 as part of host add delete workflows. Physical resource pool service 314 also adds disaggregated physical resources to physical resource pool 116 as commanded by physical hardware composer service 306. Physical resource pool 116 can include, for example, server 118, CPU 120, memory (mem) 122, storage 126, NIC 128, GPU 130, persistent memory (PMem) 132, and hardware (HW) accelerator (accel) 134 physical resources of data center hardware 102. Physical resource pool service 314 stores information describing physical resource pool 116 in HA key-value cluster store 318.

In embodiments, a user or software can call APIs of physical hardware composer service 306 (through API gateway 302) to compose resources of data center hardware 102 into clustered resource pools 162, Each clustered resource pool 162 is a collection of hosts 138 (does not have to be a cluster) having a pool of a specific physical resource. In examples, clustered resource pools 162 include storage 164 GPU 166, PMem 168, and HW accelerator 170 resource pools. Each clustered resource pool 162 provides its physical resource as a service as a single pool of that resource. For example, GPU pool 166 exports a single pool of vector operations. PMem pool 168 can export an aggregate pool of persistent memory in gigabytes. Storage pool can export an aggregate pool of storage in terabytes. HW accelerator pool 170 can export a pool of compute application, such as neural network applications, video compression applications, cryptography applications, and the like. Clustered resource pools 162 can be available for use by multiple clusters 218. For a cluster 218, physical hardware composer service 306 can add clustered resource pool resources to physical resource pool 116.

In embodiments, physical hardware composer service 306 composes physical resources from within physical resource pool 116 into hosts 138. Physical hardware composer service 306 can compose hosts 138 on command by a user or automatically, such as in response to workload provisioning requests. Physical hardware composer service 306 can also compose hosts 138 to use physical resources from one or more clustered resource pools 162 as virtual hardware 144. In embodiments, physical hardware composer service 306 can compose host(s) 138 in a cluster 218 using physical resources directly from physical resource pool 116 and from one or more clustered resource pools 162. Alternatively, physical hardware composer service 306 can compose host(s) 138 in a cluster 218 using physical resources only directly from physical resource pool 116 (e.g., a host 138 that does not use physical resource(s) from clustered resource pools 162). In embodiments, depending on bandwidth of physical network and latency requirements, clustered resource pools 162 further include CPU 172 and memory 174 pools providing CPU and memory as a service, respectively. In such case, physical hardware composer service 306 can compose a host 138 completely from clustered resource pools 162 without directly using physical resources from physical resource pool 116.

Logical resource pool service 312 collects information for all logical resources virtualized or otherwise provided by elastic hypervisors 140 into available logical resource pool 149. Logical resource pool service 312 manages logical resource pools 148 for the cluster, which include logical resources from available logical resource pool 149. Logical resource pool service 312 provides APIs (accessible through API gateway 302) for creating, modifying, reading, and deleting logical resource pools 148 and their constituent logical resources. Logical resource pool service 312 stores information describing logical resource pools 148 in HA key-value cluster store 318. Example logical resource pools 148 include logical CPU 150, logical memory 152, logical storage 154, logical PMem 156, logical GPU 158, and logical HW accelerator 160 pools. Logical resource pool service 312 aggregates the different types of resources provided by hosts 138 in a cluster 218 into available logical resource pool 149. When a new host 138 is added to cluster 218, its resources are added to available logical resource pool 149. When a host 138 is removed, its resources are subtracted from available logical resource pool 149.

Virtual hardware composer service 308 composes logical resources from logical resource pools 148 into virtual environments for VMs 146. A user or software provides a VM specification 320 to API gateway 302. VM specification 320 describes the resources needed to the workload, including reservation, limits, and shares for logical resources such as CPU, memory, PMem, storage, HW accelerator, GPU, and the like. Reservations describe a minimum guaranteed amount of a certain resource (e.g., a minimum amount of CPU cycles, memory, etc.). Limits describe an upper bound on the consumption of a certain resource. Shares specify the relative importance of the VM and can be expressed using abstract values. A VM is entitled to consume logical resources proportional to its share allocation. Elastic orchestrator 304 calls the API of virtual hardware composer service 308 to compose a virtual environment for the VM having logical resources from a logical resource pool 148. VM specification 320 can identify which logical resource pool 148 in which the VM is to be provisioned. If a logical resource pool 148 has insufficient logical resources for the VM, virtual hardware composer service 308 notifies elastic orchestrator 304. Elastic orchestrator 304 can then invoke the API of physical hardware composer service 306 to compose new hardware to satisfy what is needed for provisioning the VM (e.g., compose a new host, add virtual hardware to an existing host, etc.).

Personality manager 316 is configured to image hosts 138 as they are composed and added to the cluster. Personality manager 316 can obtain images from an image repository 274. An image includes software installation bundles (SIBs) configured to install and execute elastic hypervisor 140 on a host 138.

DRS 310 enforces resource-management policies for each VM based on the VM's reservation, limit, and share (RLS) constraints and the RLS constraints of the logical resource pool in which the VM is deployed. Conventionally, DRS 310 executes in virtualization management server 216. However, in embodiments, DRS 310 executes as part of elastic control plane 114. DRS 310 performs resource management operations, including computing the amount of resources to which each VM is entitled based on RLS constraints and recommending and performing migration of powered-on VMs to balance the load across hosts 138 and resource pools 148.

HA key-value cluster store 318 comprises a database distributed across hosts 138. HA key-value Cluster store 318 stores data describing logical resource pools 148 (e.g., RLS constraints for each logical resource pool, available logical resources, etc.) and physical resource pool 116 (e.g., available physical resources). Elastic orchestrator 304 interfaces with the components of elastic control plane 114 and orchestrates the various workflows, such as creating logical resource pools 148, creating clustered resource pools 162, and provisioning a VM.

Figure 4:
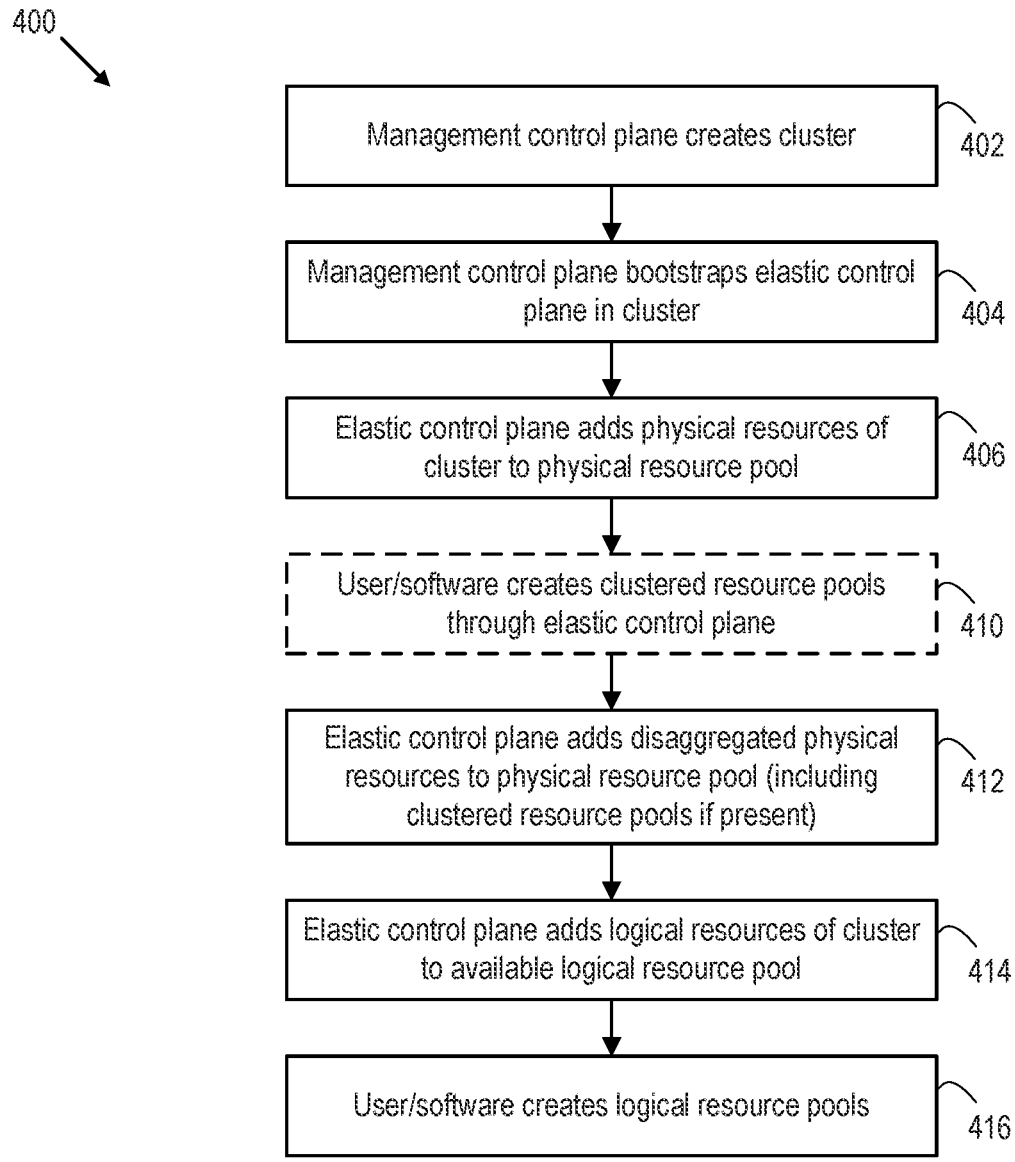
FIG. 4 is a flow diagram depicting a method of bootstrapping an elastic control plane in a host cluster according to embodiments.

FIG. 4 is a flow diagram depicting a method 400 of bootstrapping an elastic control plane in a host cluster according to embodiments. Method 400 begins at step 402, where management control plane 136 creates a cluster from a set of hosts 138. Hosts 138 comprise pre-assembled servers 104 or servers composed from disaggregated hardware 106. At step 404, management control plane 136 bootstraps elastic control plane 114 in the cluster. Services of elastic control plane 114 can execute in one or more VMs 146, such as native VM(s) 146A and/or pod VM(s) 146B. Services of elastic control plane 114 can be replicated and load balanced across VMs 146.

At step 406, elastic control plane 114 adds the physical resources of hosts 138 in the cluster to physical resource pool 116. At step 410, a user or software creates clustered resource pools 162 from disaggregated hardware 106. Step 410 is optional. In some embodiments, clustered resource pools 162 can be created prior to formation of the cluster. In some embodiments, clustered resource pools 162 are not present or used by cluster. At step 412, elastic control plane adds disaggregated physical resources to physical resource pool 116, which includes clustered resource pools if present. At step 414, elastic control plane adds logical resources of cluster to available logical resource pool 149. At step 416, a user or software creates logical resource pools 148 having logical resources from available logical resource pool 149. Logical resource pools 148 can be defined using RLS constraints on the logical resources in available logical resource pool 149.

Figure 5:
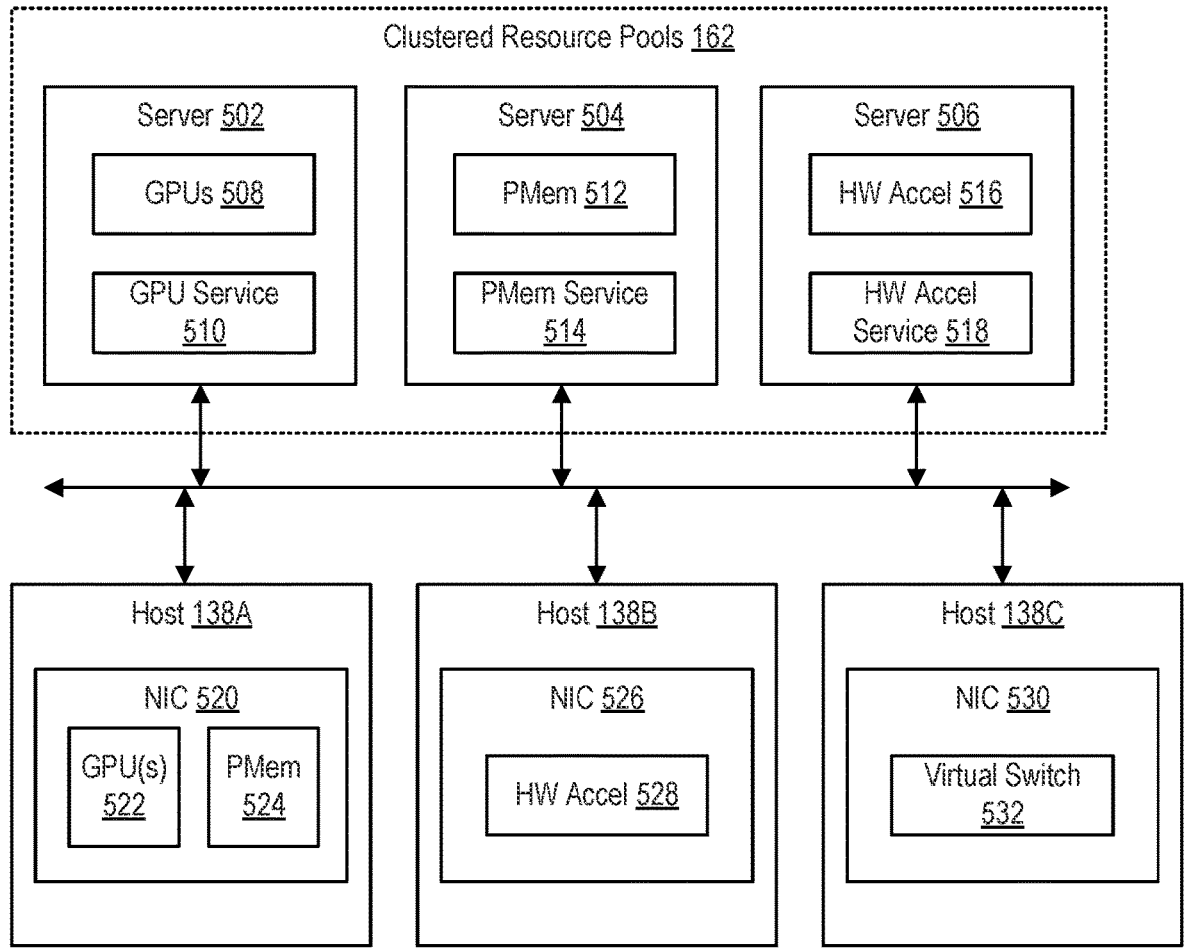
FIG. 5 is a block diagram depicting hosts in a duster configured with virtual hardware according to embodiments.

FIG. 5 is a block diagram depicting hosts in a cluster configured with virtual hardware according to embodiments. In the example, clustered resource pools 162 include servers 502, 504, and 506. Each of the servers can be a pre-assembled server 104 or a server composed from disaggregated hardware 106. Each of the servers includes a hardware platform having CPU and memory resources, as well as a pool of a specific resource. For example, server 502 includes GPUs 508, server 504 includes PMem 512, and server 506 includes HW accelerators 516. The pooled resources can be from disaggregated hardware 106 and/or pre-assembled servers 104. Each of the servers includes a software platform executing on the hardware platform, which can be a hypervisor (e.g., elastic hypervisor 140) or a host OS. Each of the servers includes a service executing on the software platform configured to control access to the pooled resource. In the example, server 502 executes a GPU service 510, server 504 executes a PMem service 514, and server 506 executes a HW accelerator service 518. The services export their respective pool resource to hosts 138 as needed. In the example, a host 138A includes a NIC 520 that cooperates with GPU service 510 and PMem service 514 to present GPUs 522 and PMem 524, respectively, as virtual hardware 144. A host 138B includes a MC 526 that cooperates with HW accelerator service 518 to present a HEW accelerator 528 as virtual hardware 144. A host 138C includes a NIC 530 that executes software to present a virtual switch 532 as virtual hardware 144. VMs 146 executing in hosts 138A, 138B, and 138C can consume the virtual hardware based on their VM specifications and the specifications of their assigned logical resource pools.

In embodiments, a pooled resource in clustered resource pools 162 can be dedicated to a host 138 when requested. For example, a CRU 508 in server 502 can be dedicated to host 138A as a GPU 522. In embodiments, a pooled resource in clustered resource pool 162 can be shared among hosts 138 when requested. For example, a HW accelerator 516 can be shared among host 138B and one or more other hosts (not shown). In such case, HW accelerator service 518 arbitrates access to HW accelerators 516 among the hosts sharing the resource.

Figure 6:
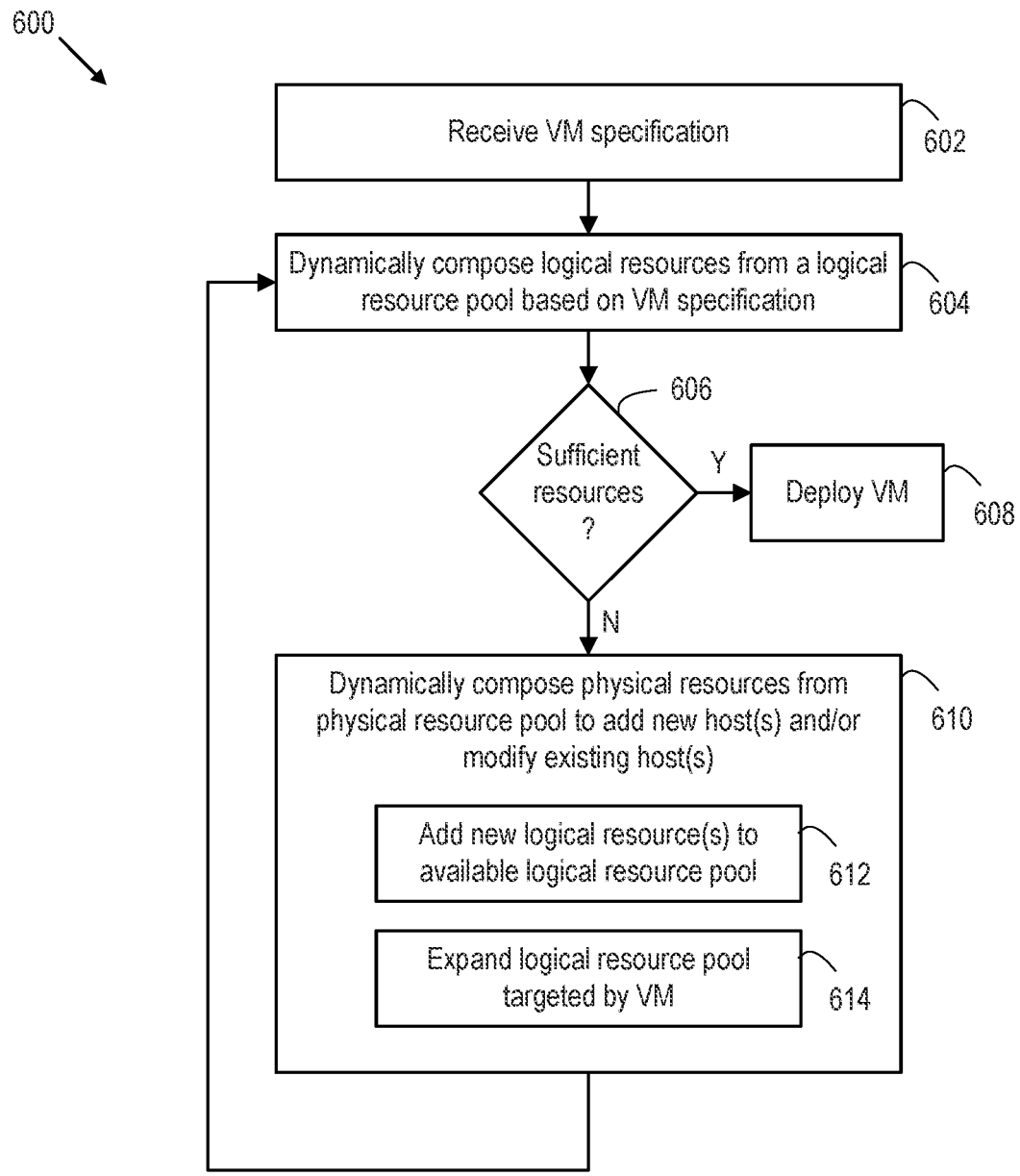
FIG. 6 is a flow diagram depicting a method of deploying a VM according to an embodiment.

FIG. 6 is a flow diagram depicting a method 600 of deploying a VM according to an embodiment. Method 600 begins at step 602, where elastic control plane 114 receives a VM specification describing resource requirements of the VM (e.g., in terms or RLS constraints) and a logical resource pool in which the VM is to be deployed. At step 604, elastic control plane 114 dynamically composes logical resources in the logical resource pool based on the VM specification. At step 606, elastic control plane 114 determines if there are sufficient logical resources in the logical resource pool to compose a virtual environment for the VM based on its specification. If so, method 600 proceeds to step 608, where elastic control plane 114 deploys the VM as specified in the logical resource pool. If not, method 600 proceeds to step 610. At step 610, elastic control plane 114 dynamically composes physical resources from physical resource pool to add new host(s) 138 and/or modify existing host(s) 138. For example, elastic control plane 114 can modify an existing host 138 by adding virtual hardware 144 as needed by the VM being deployed. Method 600 then returns to step 604 to compose the logical resources from the logical resource pool into a virtual environment for the VM. Note, as described above, elastic control plane 114 adds the logical resources of any newly composed host(s) 138 and/or modified host(s) 138 to available logical resource pool 149 (step 612). Elastic control plane 114 can then expand the logical resource pool in which the VM is to be deployed with the new logical resources (step 614), resulting in the VM being deployed at step 608.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of deploying a virtual machine (VM) in a software-defined data center (SDDC), comprising:
receiving a VM specification for the VM at an elastic control plane executing in a cluster of hosts, the cluster of hosts having a virtualization layer, the VM specification describing resource requirements for the VM;
composing, by the elastic control plane in response to the VM specification, logical resources of the cluster managed by the virtualization layer to satisfy a portion of the resource requirements;
determining, by the elastic control plane, that the logical resources of the cluster are insufficient to satisfy another portion of the resource requirements;
composing, by the elastic control plane, physical resources of the SDDC to add new hardware to the cluster, the new hardware including a physical resource external to the hosts of the cluster, the physical resource coupled to a host of the hosts through a network interface controller (NIC) of the host, the NIC adding the physical resource as a local physical resource that is local to a hardware platform of the host though which the host can access the physical resource;

composing, by the elastic control plane, software-defined resources executed on a data processing unit (DPU) of the NIC;

expanding, by the elastic control plane, the logical resources with new logical resources managed by the virtualization layer and backed by the new hardware and the software-defined resources to satisfy the other portion of the resource requirements; and deploying, by the elastic control plane, the VM in a virtual environment composed from the logical resources as expanded.

2. The method of claim 1, wherein the logical resources are included in a logical resource pool managed by the elastic control plane and identified by the VM specification.

3. The method of claim 1, wherein the physical resources that back the new hardware are included in a physical resource pool managed by the elastic control plane.

4. The method of claim 3, wherein the physical resources comprise disaggregated hardware in the SDDC.

5. The method of claim 4, wherein the new hardware comprises virtual hardware presented to a host in the cluster and backed by a physical resource of the disaggregated hardware.

6. The method of claim 4, wherein the physical resources of the disaggregated hardware are composed into clustered resource pools by the elastic control plane.

7. A non-transitory computer readable medium comprising instructions to be executed in a computing device to cause the computing device to carry out a method of deploying a virtual machine (VM) in a software-defined data center (SDDC), comprising:

receiving a VM specification for the VM at an elastic control plane executing in a cluster of hosts, the cluster of hosts having a virtualization layer, the VM specification describing resource requirements for the VM;

composing, by the elastic control plane in response to the VM specification, logical resources of the cluster managed by the virtualization layer to satisfy a portion of the resource requirements;

determining, by the elastic control plane, that the logical resources of the cluster are insufficient to satisfy another portion of the resource requirements;

composing, by the elastic control plane, physical resources of the SDDC to add new hardware to the cluster, the new hardware including a physical resource external to the hosts of the cluster, the physical resource coupled to a host of the hosts through a network interface controller (NIC) of the host, the NIC adding the physical resource as a local physical resource that is local to a hardware platform of the host though which the host can access the physical resource;

composing, by the elastic control plane, software-defined resources executed on a data processing unit (DPU) of the NIC;

expanding, by the elastic control plane, the logical resources with new logical resources managed by the virtualization layer and backed by the new hardware and the software-defined resources to satisfy the other portion of the resource requirements; and deploying, by the elastic control plane, the VM in a virtual environment composed from the logical resources as expanded.

8. The non-transitory computer readable medium of claim 7, wherein the logical resources are included in a logical resource pool managed by the elastic control plane and identified by the VM specification.

9. The non-transitory computer readable medium of claim 7, wherein the physical resources that back the new hardware are included in a physical resource pool managed by the elastic control plane.

10. The non-transitory computer readable medium of claim 9, wherein the physical resources comprise disaggregated hardware in the SDDC.

11. The non-transitory computer readable medium of claim 10, wherein the new hardware comprises virtual hardware presented to a host in the cluster and backed by a physical resource of the disaggregated hardware.

12. The non-transitory computer readable medium of claim 10, wherein the physical resources of the disaggregated hardware are composed into clustered resource pools by the elastic control plane.

13. A virtualized computing system, comprising:
a cluster of hosts having a virtualization layer; and
an elastic control plane executing in the cluster, the elastic control plane configured to:
receive a VM specification for the VM, the VM specification describing resource requirements for the VM;
compose, in response to the VM specification, logical resources of the cluster managed by the virtualization layer to satisfy a portion of the resource requirements;
determine that the logical resources of the cluster are insufficient to satisfy another portion of the resource requirements;
compose physical resources of the virtualized computing system to add new hardware to the cluster, the new hardware including a physical resource external to the hosts of the cluster, the physical resource coupled to a host of the hosts through a network interface controller (NIC) of the host, the NIC adding the physical resource as a local physical resource that is local to a hardware platform of the host though which the host can access the physical resource;
compose software-defined resources executed on a data processing unit (DPU) of the NIC
expand the logical resources with new logical resources managed by the virtualization layer and backed by the new hardware and the software-defined resources to satisfy the other portion of the resource requirements; and
deploy the VM in a virtual environment composed from the logical resources as expanded.

14. The virtualized computing system of claim 13, wherein the logical resources are included in a logical resource pool managed by the elastic control plane and identified by the VM specification.

15. The virtualized computing system of claim 13, wherein the physical resources that back the new hardware are included in a physical resource pool managed by the elastic control plane.

16. The virtualized computing system of claim 15, wherein the physical resources comprise disaggregated hardware in the virtualized computing system.

17. The virtualized computing system of claim 16, wherein the physical resources of the disaggregated hardware are composed into clustered resource pools by the elastic control plane.

\* \* \* \* \*